(12) United States Patent
Vander Veen et al.

(10) Patent No.: US 8,620,295 B2
(45) Date of Patent: Dec. 31, 2013

(54) METHOD AND APPARATUS FOR MODIFYING NOTIFICATION SETTINGS ON A MOBILE ELECTRONIC DEVICE

(75) Inventors: Raymond Paul Vander Veen, Waterloo (CA); David P. Yach, Waterloo (CA); Michael T. Hardy, Waterloo (CA)

(73) Assignee: BlackBerry Limited, Waterloo, ON (CA)

( * ) Notice: Subject to any disclaimer, the term of this patent is extended or adjusted under 35 U.S.C. 154(b) by 654 days.

(21) Appl. No.: 12/398,263

(22) Filed: Mar. 5, 2009

(65) Prior Publication Data
US 2010/0227600 A1   Sep. 9, 2010

(51) Int. Cl.
*H04M 3/00* (2006.01)
(52) U.S. Cl.
USPC .................. 455/418; 455/414.1; 455/550.1
(58) Field of Classification Search
USPC ........ 455/403, 418, 566, 456.6, 412.2, 414.1; 719/318
See application file for complete search history.

(56) References Cited

U.S. PATENT DOCUMENTS

| | | | |
|---|---|---|---|
| 5,973,612 A * | 10/1999 | Deo et al. ................. | 340/7.58 |
| 6,633,758 B1 * | 10/2003 | Heinonen et al. .......... | 455/418 |
| 6,990,333 B2 * | 1/2006 | Andrew et al. ........... | 455/414.1 |
| 2002/0116541 A1 * | 8/2002 | Parker et al. ............. | 709/318 |
| 2007/0021108 A1 * | 1/2007 | Bocking et al. ........... | 455/414.1 |
| 2008/0051154 A1 | 2/2008 | Schlomann et al. | |
| 2009/0029681 A1 * | 1/2009 | Clemow et al. ........... | 455/412.2 |
| 2009/0186633 A1 * | 7/2009 | Yonker et al. ............. | 455/456.6 |
| 2009/0249247 A1 * | 10/2009 | Tseng et al. .............. | 715/808 |

FOREIGN PATENT DOCUMENTS

| | | |
|---|---|---|
| WO | 027412 A1 | 1/2002 |
| WO | 03060711 A2 | 7/2003 |

OTHER PUBLICATIONS

AOL Instant messenger: http://www.lafn.org/webconnect/mentor/aim-5-5-3572/index.html.
Microsoft Office Online http://office.microsoft.com./enus/outlook/HA100986701033.aspx?pid=CH101032711033.
European Patent Application No. 09 15 4472 Search Report dated Aug. 4, 2008.

* cited by examiner

*Primary Examiner* — San Htun
*Assistant Examiner* — Nathan Taylor
(74) *Attorney, Agent, or Firm* — Perry + Currier (57) ABSTRACT

A method and apparatus for modifying notification settings on a mobile electronic device is provided, the mobile electronic device comprising a processing unit, a display, a memory, an input device, and at least one notification device. It is determined that the at least one notification device has been activated using a given notification setting. A menu list is responsively changed to include a notification setting change option, the menu list associated with the input device and stored in the memory, such that when the input device is activated, the display is controlled by the processing unit to provide a representation of the menu list such that the notification setting option can be selected and the given notification setting changed.

16 Claims, 5 Drawing Sheets

METHOD AND APPARATUS FOR MODIFYING NOTIFICATION SETTINGS ON A MOBILE ELECTRONIC DEVICE

FIELD

The specification relates generally to computing devices, and specifically to a method and apparatus for modifying notification settings on a mobile electronic device.

BACKGROUND

Mobile electronic devices (such as cellphones, PDAs and/or smartphones), can have several different notification settings for notification events such as phone calls, emails, SMS, reminders, etc. Each notification setting can be different for each notification event, such that different notifications cause the mobile electronic device to play a ringtone and/or vibrate, at a specific volume, and in a different manner. For example, a ringtone used for Email messages might be different from that used for SMS messages.

However, as mobile electronic devices become more complex and provide more services, the number of different notifications can increase significantly. When a particular notification (e.g. an email message) is triggered, it can be desirable to change some aspect of the notification settings shortly thereafter, such as the ringtone, the volume, vibration settings, etc.

Currently, however, notification settings must be accessed via a notification settings application which provides all the notification settings for the mobile electronic device, such that a particular notification setting must be located and accessed before a change to the setting can occur. This leads to increased wear and tear on an input device used to locate and launch the notification settings application and to locate the particular notification setting. This further leads to inefficient use of system resources at the mobile electronic device as an unreasonable amount of input data must be processed while the particular notification setting is located.

BRIEF DESCRIPTIONS OF THE DRAWINGS

Embodiments are described with reference to the following figures, in which.

DETAILED DESCRIPTION OF THE EMBODIMENTS

A first aspect of the specification provides a method for modifying notification settings on a mobile electronic device comprising a processing unit, a display, a memory, an input device, and at least one notification device. The method comprises determining that the at least one notification device has been activated using a given notification setting. The method further comprises responsively changing a menu list to include a notification setting change option, the menu list associated with the input device and stored in the memory, such that when the input device is activated, the display is controlled by the processing unit to provide a representation of the menu list such that the notification setting option can be selected and the given notification setting changed.

The method can further comprise: determining that the input device has been activated; controlling the display device to display a representation of the menu list; determining that the notification setting change option has been selected; and changing the given notification setting.

The notification setting change option can be removed from the menu list in the memory after a given time period.

The at least one notification device can be activated due to at least one of an alarm, a reminder, a calendar notification event, and receipt of data from a communication network. The data from the communication network can include at least one of an e-mail, a text message, a short message service (SMS) message, and a voice call.

The at least one notification device can include at least one of a speaker enabled to play audio when the notification triggering event occurs and a vibration motor enabled to cause the mobile electronic device to vibrate when the notification triggering event occurs.

The given notification setting can include at least one of a volume setting, an association between the notification event and an audio file, and a vibration setting. The audio file can include a ringtone.

A second aspect of the specification provides a mobile electronic device for modifying notification settings. The mobile electronic device comprises a processing unit, a display, a memory, an input device, and at least one notification device, in communication via a computer bus. The mobile electronic device is enabled to determine that the at least one notification device has been activated using a given notification setting. The mobile electronic device is further enabled to responsively change a menu list to include a notification setting change option, the menu list associated with the input device and stored in the memory, such that when the input device is activated, the display is controlled by the processing unit to provide a representation of the menu list such that the notification setting option can be selected and the given notification setting changed.

The mobile electronic device can be further enabled to: determine that the input device has been activated; control the display device to display a representation of the menu list; determine that the notification setting change option has been selected; and change the given notification setting.

The notification setting change option can be removed from the menu list in the memory after a given time period.

The at least one notification device can be activated due to at least one of an alarm, a reminder, a calendar notification event, and receipt of data from a communication network. The data from the communication network includes at least one of an e-mail, a text message, a short message service (SMS) message, and a voice call.

The at least one notification device can include at least one of a speaker enabled to play audio when the notification triggering event occurs and a vibration motor enabled to cause the mobile electronic device to vibrate when the notification triggering event occurs.

The given notification setting can include at least one of a volume setting, an association between the notification event and an audio file, and a vibration setting. The audio file can include a ringtone.

Figure 1:
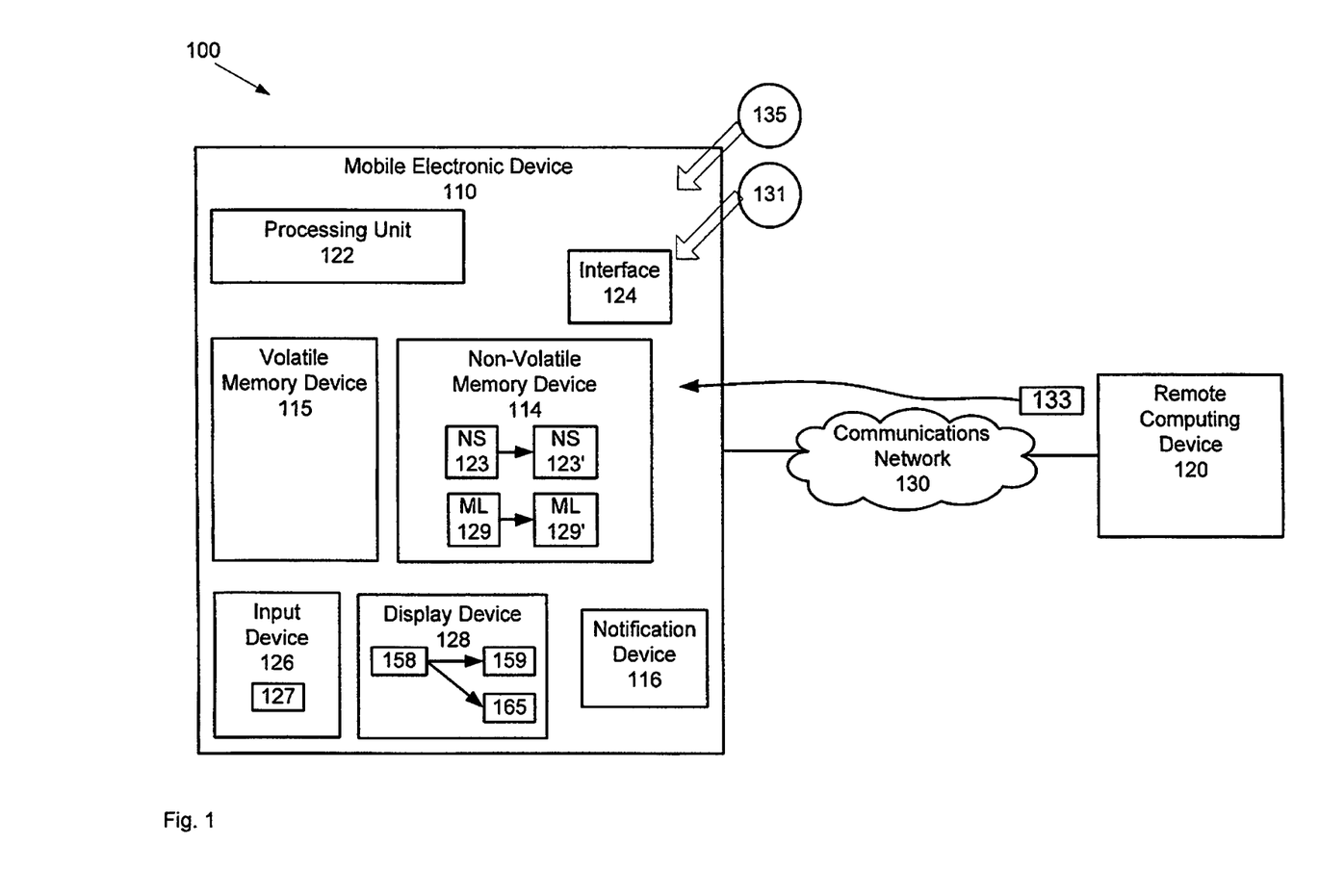
FIG. 1 depicts a system for modifying notification settings at a mobile electronic device, according to non-limiting embodiments.

FIG. 1 depicts a system 100, including a mobile electronic device 110 for modifying notification settings, according to non-limiting embodiments. Mobile electronic device 110 comprises a processing unit 122, a communications interface 124, a non-volatile memory device 114, a volatile memory device 115, at least one notification device 116, an input device 126 and display device 128 all in communication, for example, via a computing bus (not depicted). In general, non-volatile memory 114 stores notification settings 123, described below, which can be processed by processing unit 122 to control notification device 116 when a notification triggering event occurs at mobile electronic device 110. Notification settings 123 will be described in further detail below. Non-limiting examples of notification triggering events include, but are not limited to, an alarm within a calendaring application (e.g. stored and processed at mobile electronic device 110), a reminder within a calendaring application, and/or receipt of data 133 from a remote computing device 120, such as e-mail, a text message, a short message service message (SMS) and data for setting up a voice call between mobile electronic device 110 and remote computing device 120.

Mobile electronic device 110 further comprises an application 131 that can be stored in non-volatile memory 114. Application 131, upon being processed by processing unit 122, enables mobile electronic device 110 to modify notification settings 123, for example by receiving input from input device 126 indicative of how notification settings 123 are to be changed.

Figure 2:
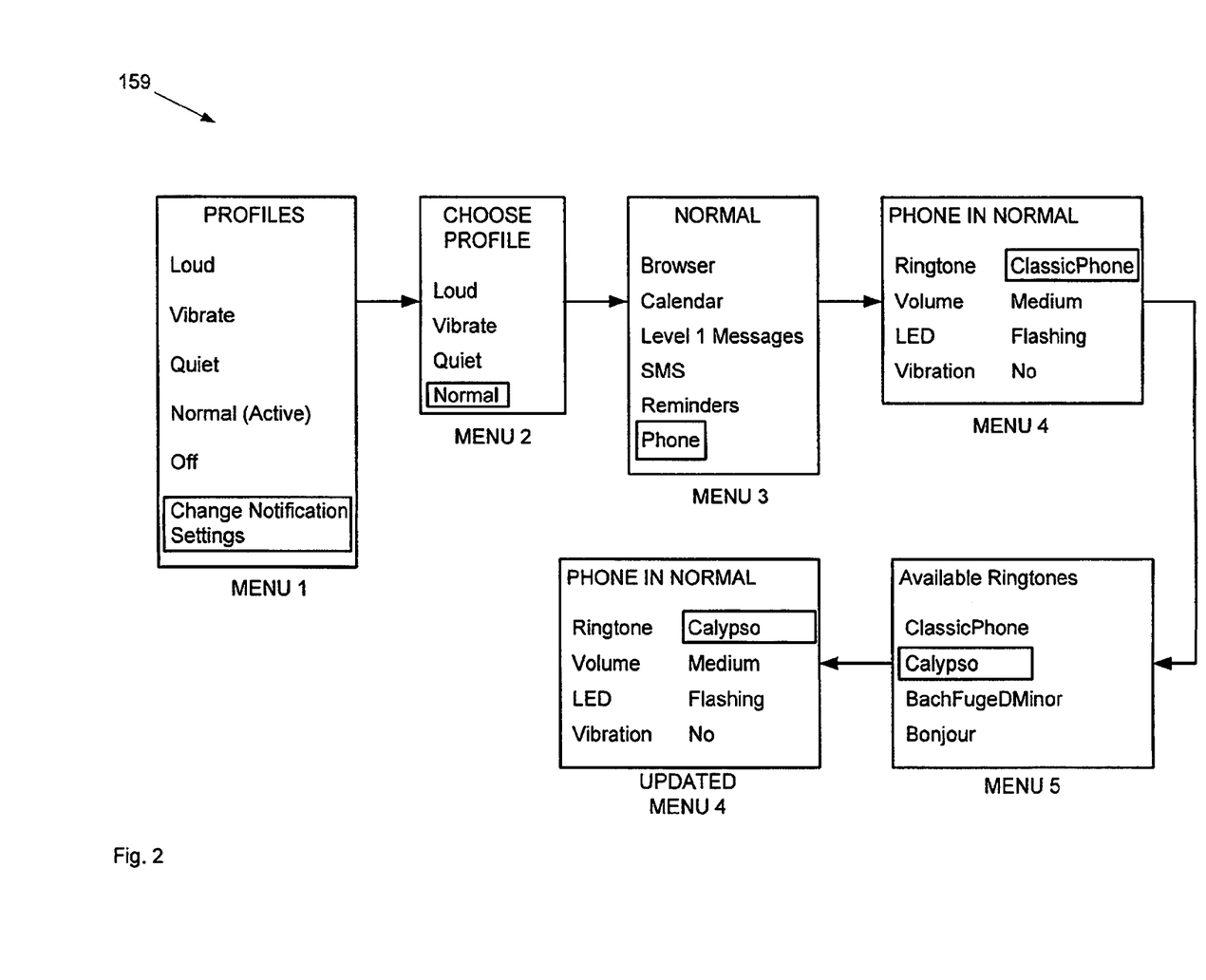
FIG. 2 depicts a menu system for modifying notification settings at a mobile electronic device, according to non-limiting embodiments.

Furthermore, processing unit 122 is enabled to control display device 128 to produce a representation 159 of application 131 and notification settings 123, displayed therein. In a non-limiting exemplary embodiment, as depicted in FIG. 2, representation 159 can comprise a plurality of menus, MENU1, MENU2, MENU3, MENU4 and MENU5. Each of MENU1-MENU5 comprises a header (each header depicted in capital letters in FIG. 2, for example "PROFILES" in MENU1), and plurality of selectable menu items (e.g. each of "Loud", "Vibrate", "Quiet", "Normal", "Off" and "Change Notification Settings" in MENU 1 can be selected). In general, each menu item MENU1 comprises menu items that can be selected to activate a defined profile (each profile comprising a set of notification settings (e.g. notification settings 123) that is to be activated when a profile is selected). For example, in FIG. 2, the profile "Normal" has been activated, as indicated by "(Active)" after "Normal". However, selection of the menu item "Change Notification Settings" results in MENU2 being provided within representation 159.

Each menu item in MENU2 comprises menu items that can be selected to determine which given profile is to be edited. For example, in FIG. 2, "Normal" has been selected indicating that the set of notification settings in the profile "Normal" is to be edited. Selection of the menu item "Normal" results in MENU3 being provided within representation 159.

Each menu item in MENU3 comprises menu items that can be selected to determine which notification settings, in the profile selected in MENU2, and associated with a given application, are to be edited. For example, in FIG. 2, "Phone" has been selected indicating that the set of notification settings in the profile "Normal" associated with a phone application are to be edited. Selection of the menu item "Phone" results in MENU4 being provided within representation 159.

Each menu item in MENU4 comprises menu items that can be selected to edit notification settings associated with the application "Phone". Each menu item in MENU4 comprises a label (e.g. "Ringtone", "Volume", "LED" (Light Emitting Diode) and "Vibration") and an associated notification setting ("ClassicPhone", "Medium", "Flashing" and "No", respectively). Each notification setting can be edited/changed by selecting the notification setting. For example, in FIG. 2, "Ringtone" has been selected indicating that the notification settings associated with ringtones for "ClassicPhone" are to be edited. Selection of the menu item "Phone" results in MENU5 being provided within representation 159.

Each menu item in MENU5 comprises menu items that can be selected to change notification settings associated with "Ringtone" in MENU4. Each menu item in MENU5 comprises the name of an audio file (having any suitable format), stored at computing device 110 (e.g. in non-volatile memory 114). Selection of an audio file results in the notification setting for "Ringtone" being changed to the selected audio file (e.g. "Ringtone" has been changed from "ClassicPhone" to "Calypso"). Selection of the menu item "Calypso " results in UPDATED MENU 4 being provided within representation 159, similar to MENU 4, however, with the appropriate notification setting updated to that selected in MENU5. Furthermore, notification settings 123 are changed to updated notification settings 123', depicted in FIG. 1, updated notification settings 123' comprising the changes to notification settings that result due to selections made in MENU5 (or any other suitable menu).

It is understood that representation 159 comprises any suitable number of menus, for example, selection of each menu item in each of MENU2-MENU4 results in a suitable menu being provided, associated with the given selection. In this manner, notification settings 123 can be updated for each profile and for each application, in any suitable combination.

However, this is cumbersome and further results in excessive input data being received and processed from input device 126, and is an inefficient use of processing unit 122 and display device 128, as well as increasing wear and tear on input device 126. Hence, returning now to FIG. 1, mobile electronic device 110 further comprises an application 135 for updating notification settings 123, as will be described below with reference to method 123 depicted in FIG. 4.

In general notification settings 123 comprise data indicative of how notification device 116 is to be controlled when a notification triggering event occurs. Furthermore, notification settings 123 can comprise data indicative of how notification device 116 is to be controlled for a plurality of notification triggering events. A non-limiting exemplary embodiment of notification settings 123 is provided in Table 1:

TABLE 1

| Profile | Normal |
| --- | --- |
| Application | Phone |
| Ringtone | ClassicPhone |
| Volume | Medium |
| LED | Flashing |
| Vibration | No |

While Table 1 is presented in rows and columns, it is understood that notification settings 123 can be stored in any suitable format and need not be arranged in rows and columns. Table 1 comprises a profile identifier ("Normal"), an application identifier ("Phone"), and associated notification settings, similar to the example depicted in FIG. 2. Specifically, Table 1 comprises 4 notification setting entries for each of "Ringtone", "Volume", "LED" and "Vibration": respectively, "ClassicPhone", "Medium", "Flashing" and "No". Each entry is indicative of how notification device 116 is to be controlled when voicecall data (e.g. data 133) is received at mobile electronic device 110. Specifically, "ClassicPhone" is indicative that an audio file named "ClassicPhone" is to be processed, such that notification device 116 (which in this instance includes a speaker) is controlled to play the file (i.e. emit sound); "Medium" is indicative that the audio file is to be played at medium volume; "Flashing" is indicative that notification device 116 (which in this instance further includes a light emitting diode) is to be controlled to flash an LED; and "Vibration" is indicative that notification device 116 is not to vibrate (i.e. in this instance, notification device 116 further includes a vibration motor). It is understood that notification settings 123 can comprise any suitable number of entries, each corresponding to any suitable notification setting (and/or suitable headers). It is understood that Table 1 can comprise any suitable number of columns and rows, and any suitable type of data. For example, Table 1 can further comprise notification settings for other profiles and other applications.

In general, mobile electronic device 10 comprises any suitable computing and/or communication device for processing applications 131, 135, including but not limited to any suitable combination of laptops, mobile electronic devices, PDA's, cell phones and the like. Other suitable types of mobile electronic devices are within the scope of present embodiments.

Communications interface 124 is enabled to communicate with remote computing device 120 via communications network 130. Accordingly, communications interface 124 is enabled to communicate via communications network 130 according to any suitable protocol which is compatible with communications network 130. Further, communications interface 124 is enabled to communicate in a wireless or wired manner, as desired, compatible with communications network 130, including but not limited to packet based protocols, Internet protocols, analog protocols, PSTN protocols, cell phone protocols (1X, UTMS, CDMA, GMS, and the like), WiFi protocols, WiMax protocols and/or a combination. Other suitable protocols are within the scope of present embodiments.

Similarly, communication networks 130, can comprise any suitable combination of wired and/or wireless networks, including but not limited to packet based networks, the Internet, analog networks, the PSTN, LAN, WAN, cell phone networks, WiFi networks, WiMax networks and/or a combination. Other suitable types of communication networks are within the scope of present embodiments.

Non-volatile memory device 114 can comprise any suitable non-volatile memory device, including but not limited to read-only memory (ROM), flash memory, magnetic computer storage devices (e.g. hard disks, floppy disks, and magnetic tape), optical discs, and the like.

Volatile memory 115 can comprise any suitable volatile memory device, including but not limited to random access memory (RAM), and the like. In general, volatile memory device 115 is enabled to store representation data for controlling display device 128 to display representations 159, 165 (described below).

Notification device 116 can comprises any suitable combination of notification devices including but not limited to an audio device (e.g. a speaker), a light (e.g. light emitting diode and the like) and a vibration device (e.g. a vibration motor).

Input device 126 is generally enabled to receive input data, and can comprise any suitable combination of input devices, including but not limited to a keyboard, a pointing device, a mouse, a track wheel, a touchpad, a touch screen and the like. In alternative embodiments input data can be received at mobile electronic device 110 via communications interface 124 and/or communications network 130, for example, from other computing devices, such as remote computing device 120.

In particular, input device 126 comprises a key 127 which is dedicated to causing processing unit 122 to control display device 128 to produce a representation 165 of a system menu list 129 stored in non-volatile memory device 114, when it is determined that key 127 has been activated. It is understood that at least one key 127 can comprise any suitable dedicated input device, including but not limited to a button and/or any suitable combination of keyboard entries on a key board (e.g. "control S") and/or a pointing device. It is further understood that in further embodiments, dedicated key 127 can comprise a virtual key and/or button, provided at display device 128 and selectable via input device 126.

System menu list 129 comprises a list of data representative of applications stored at computing device 110 which can be processed upon selection of a given application in representation 165, described below. In general, each application listed in system menu list 129 comprises an application that can be accessed regardless of other processes occurring at mobile electronics device 110 and is launchable when selected in representation 165. A non-limiting exemplary embodiment of system menu list 129 is provided in Table 2:

TABLE 2

Help
Switch Application
Close

While Table 2 is presented in rows and columns, it is understood that system menu list 129 can be stored in any suitable format and need not be arranged in rows and columns. Table 2 comprises 3 entries, each associated with an application stored at mobile electronics device 110, and launchable. "Help" is associated with an application which provides help information; "Switch Application" is associated with an application that enables launching and/or switching between a subset of applications at mobile electronic device 110; and "Close" is associated with an application that causes representation 165 to close.

Figure 3:
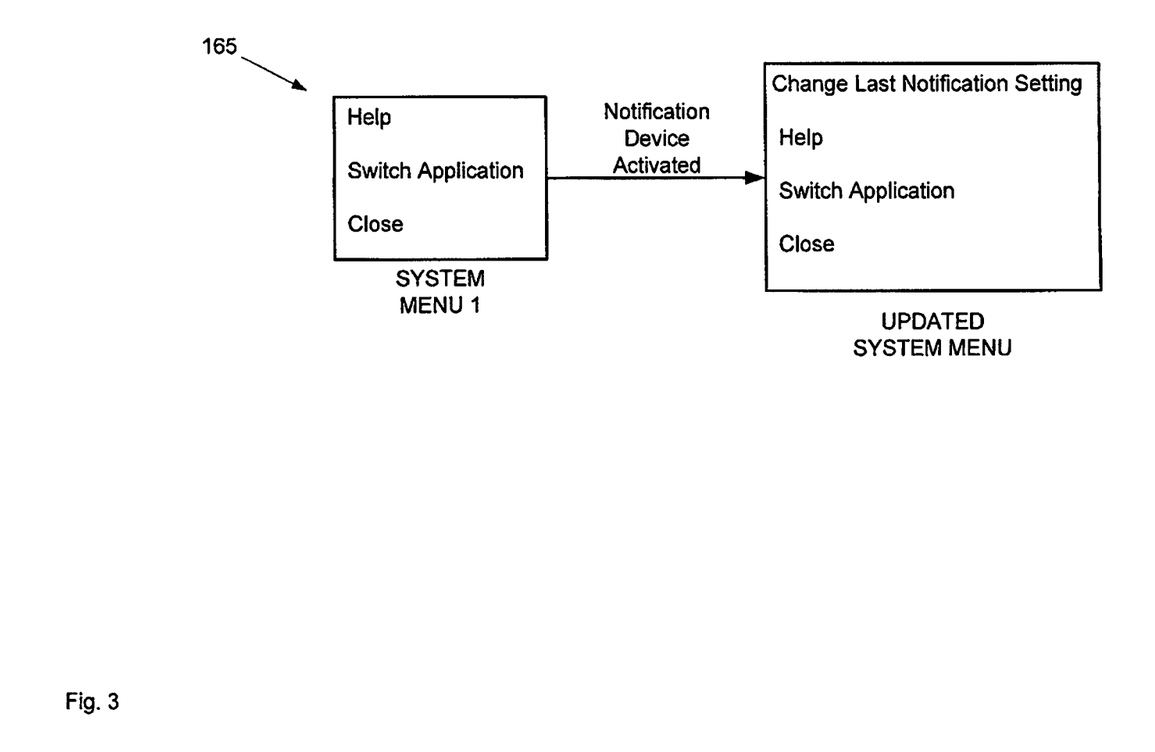
FIG. 3 depicts a system menu and an updated system menu including a change last notification setting option, according to non-limiting embodiments.

Hence, when it is determined that key 127 is activated, display device 128 is controlled to provide representation 165. A non-limiting exemplary embodiment of representation 165 is provided in FIG. 3 and comprises SYSTEM MENU 1. SYSTEM MENU 1 is provided when key 127 is activated, each item in SYSTEM MENU 1 being selectable to launch the associated application, e.g. via input device 126 (e.g. a pointing device). An UPDATED SYSTEM MENU is also depicted in FIG. 3, as described below with reference to method 123; SYSTEM MENU 1 is changed to UPDATED SYSTEM MENU when it is determined that notification device 116 has been activated, as described below with reference to method 123, for example when application 135 is being processed.

Furthermore, system menu 129 can be updated, as desired, to add or remove applications to reflect other processes that occur at mobile communication device 110. For example, if a "Phone" application is running at mobile communication device 110 (e.g. when a voicecall is in progress and/or being initiated), system menu list 129 can be updated and can comprise Table 3:

TABLE 3

Hang Up
Forward
Hold
Help
Close
Switch Application

Table 3 is similar to Table 2, with the entries "Hang Up", "Forward" and "Hold" added, each associated with a phone related application.

Display module 128 comprises circuitry 158 for generating representations 159, 165. Display module 128 can include any suitable combination of CRT and/or flat panel displays (e.g. LCD, plasma and the like), and circuitry 158 can include any suitable combination of circuitry for controlling the CRT and/or flat panel displays etc., including but not limited to display buffers, transistors, electron beam controllers, LCD cells, plasmas cells, phosphors etc. In particular, display module 128 and circuitry 158 can be controlled by processing unit 122 to generate representations 159, 165.

Figure 4:
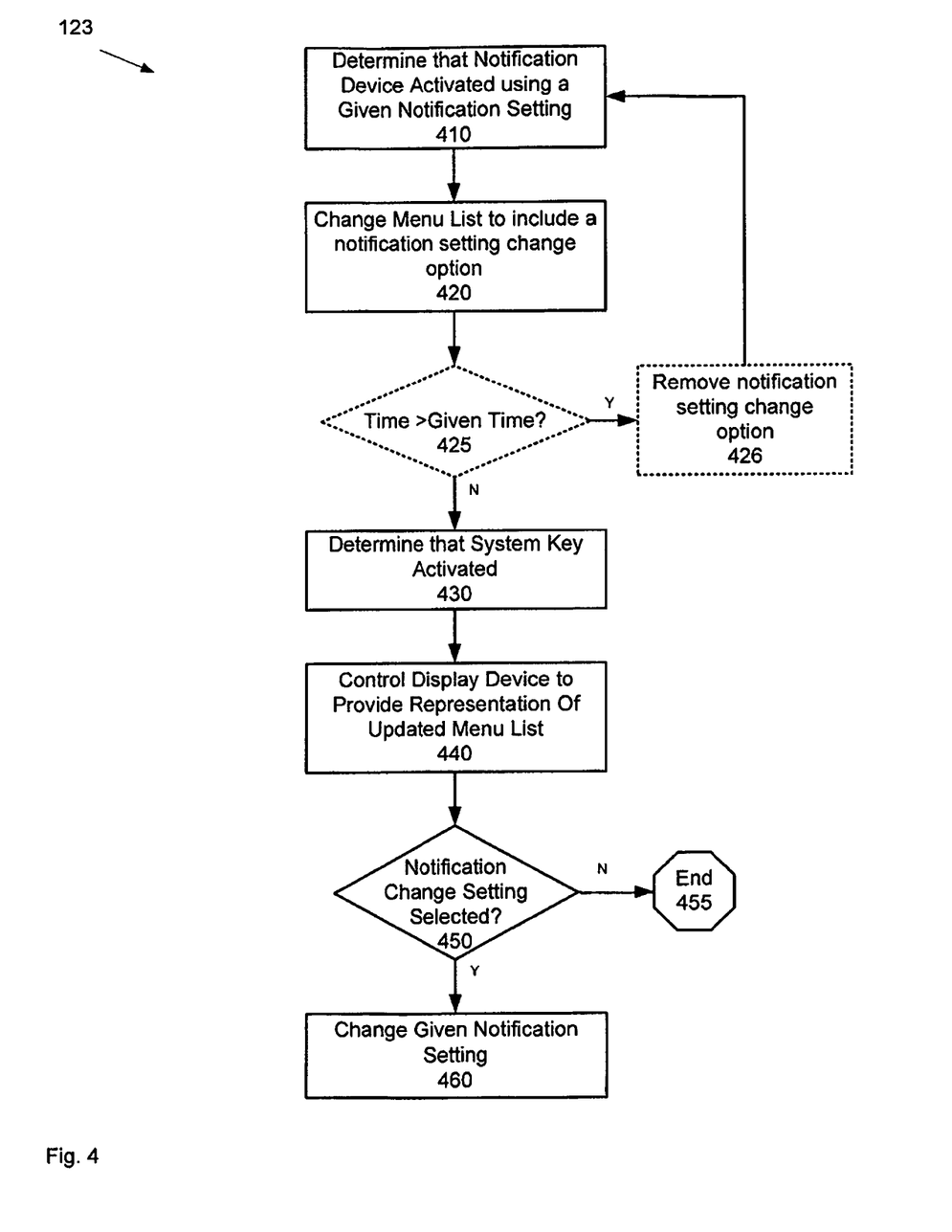
FIG. 4 depicts a method for modifying notification settings at a mobile electronic device, according to non-limiting embodiments.

Attention is now directed to FIG. 4 which depicts a method 123 for modifying notification settings on a mobile electronic device comprising a processing unit, a display, a memory, an input device, and at least one notification device. In order to assist in the explanation of the method 123, it will be assumed that the method 123 is performed using the system 100, and specifically mobile electronic device 110. Indeed, in some embodiments, method 123 can be implemented via application 135. Furthermore, the following discussion of the method 123 will lead to a further understanding of the system 100 and its various components. However, it is to be understood that the system 100 and/or the method 123 can be varied, and need not work exactly as discussed herein in conjunction with each other, and that such variations are within the scope of present embodiments.

At step 410, it is determined that notification device 116 has been activated using a given notification setting. For example due to the occurrence of a notification triggering event such as an alarm, a reminder, a calendar notification event, and/or receipt of data 133 from communication network 130, notification device 116 has been activated using an associated notification setting, for example as defined in notification settings 123 (e.g. and/or as defined in MENU 4 of FIG. 2).

At step 420, in response to determining that notification device 116 has been activated using a given notification setting, system menu list 129 is changed to updated system menu list 129' which comprises entries from system menu list 129 and a notification setting change option. For example, updated system menu list 129' can comprise Table 4:

TABLE 4

Change Last Notification Setting
Help
Switch Application
Close

Table 4 is similar to Table 2, with the entry "Change Last Notification Setting" added. Alternatively, Table 3 can be changed to include a "Change Last Notification Setting" entry.

As described above, system menu list 129 is associated with key 127, and can be stored in non-volatile memory 114, such that when key 127 is activated system menu list 129 is provided at display device 128. However, if system menu list 129 has been updated to updated system menu list 129', display device 128 is controlled by processing unit 122 to provide representation 165 including updated system menu list 129', i.e. UPDATED SYSTEM MENU depicted in FIG. 3. The notification setting option can then be selected from UPDATED SYSTEM MENU and the given notification setting for the notification device changed, (i.e. the notification setting which was most recently used to activate notification device 116).

In some embodiments, optional steps 425 and 426 can be implemented wherein the notification setting change option is removed from updated system menu list 129' after a given time period. A determination of how much time has passed since notification device 116 has been activated can occur at step 425, and a comparison made with a given time period (e.g. a few hours), for example, using a clock (not depicted) at mobile electronics device 110. At step 426, updated system menu list 129' can be changed to remove the "Change Last Notification Setting" entry, such that updated system menu list 129' reverts back to system menu list 129. Such embodiments can be implemented when it is desired to change notification settings 123 only within the given time period.

Furthermore, steps 425-426 can be implemented before, after or during any suitable step in method 123.

In any event, at step 430 it can be determined that key 127 has been activated. In response, at step 440, display device 128 is controlled to display representation 165 including entries from updated system menu list 129', for example, UPDATED SYSTEM MENU depicted in FIG. 3. At step 450 it is determined whether the notification setting change option has been selected. If not, method 123 ends at step 455 (i.e. another entry has been selected and/or UPDATED SYSTEM MENU has been closed).

If so, however, at step 460 the given notification setting can be changed by causing display device 128 to be controlled to display representation 159 of notification settings 123, and specifically a menu associated with the given notification settings most recently used to activate notification device 116, such as MENU4 depicted in FIG. 2. A given entry in the provided menu can then be updated, as described above with reference to FIG. 2, and notification settings 123 changed to notification settings 123'. Using the example depicted in FIG. 2, notification settings 123' can comprise the contents of Table 5:

TABLE 5

| Profile | Normal |
| Application | Phone |
| Ringtone | Calypso |
| Volume | Medium |
| LED | Flashing |
| Vibration | No |

Table 5 is similar to Table 1, however with "Ringtone" changed from "ClassicPhone" to "Calypso".

In general, by changing system menu list 129 to updated system menu list 129', which includes a notification settings change entry, convenient access to the notification settings most recently used to activate notification device 116 is provided. This obviates the problem of changing notification settings 123 via a complex menu system, for example as depicted in FIG. 2. Hence, reduction of wear and tear at input device 126 is provided, as well as a more efficient use of system resources as processing of input data associated with accessing the menu system is eliminated.

Certain further advantages will now be explained. Since hand-held electronic devices typically provide a relatively small display screen having a limited screen size and resolution, the foregoing can provide relatively quick and efficient access to notification settings most recently used to control a notification device. The teachings herein optimize the control of the memory and the display of the computing device so as to provide access to a menu for changing the settings of the most recent notification, and thereby reduce the cumbersome use of key-boarding, trackball manipulation, or trackwheel manipulation or the like. This contrasts with certain prior art mobile applications implementations on hand-held electronic devices, which display a complex menu system, across a large number of screens, in a manner that can be cumbersome to scroll through or to access. In these prior art configurations, settings for the most recent notification are accessible after navigating the complex menu system, similar to that depicted in FIG. 2.

Figure 5:
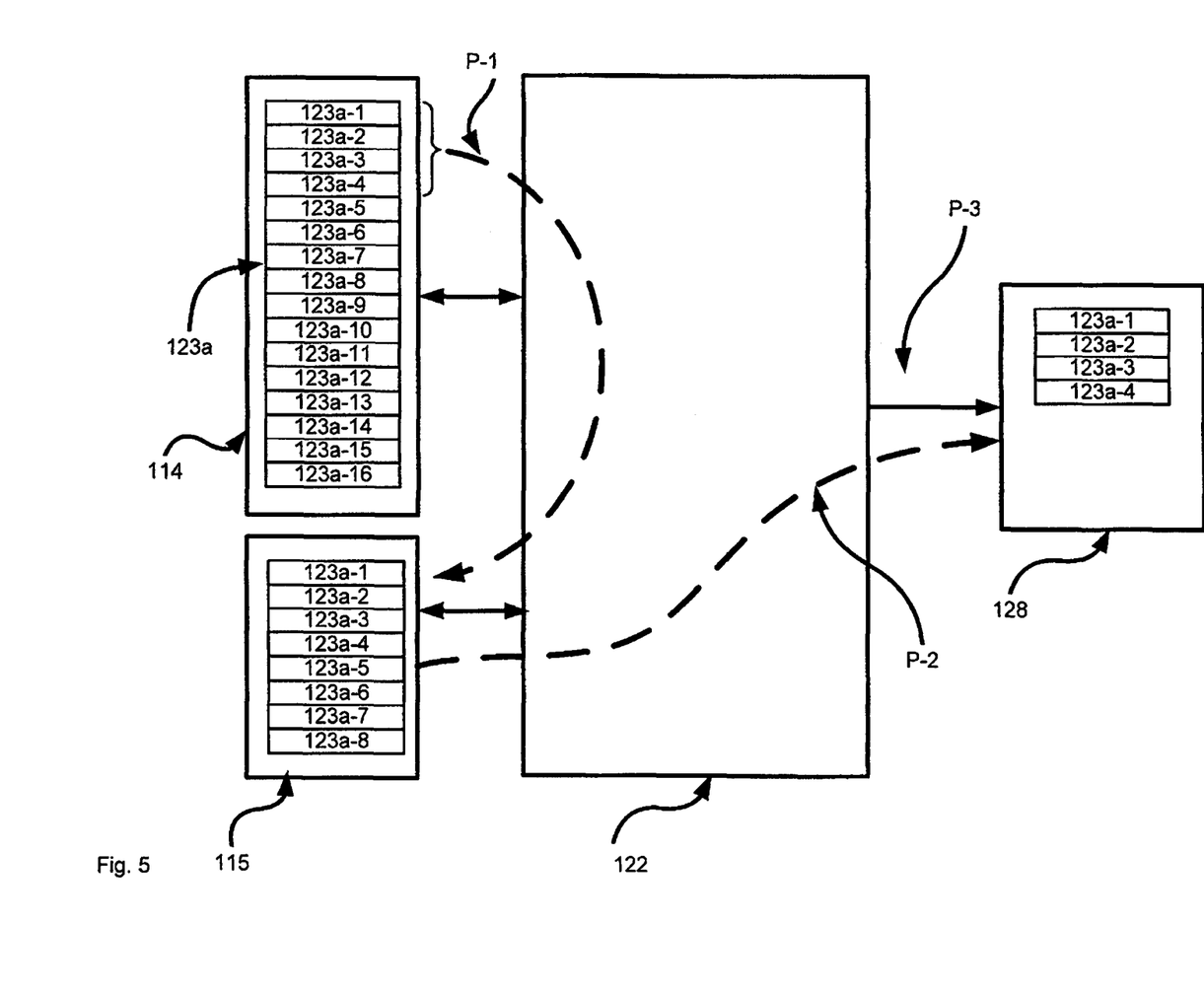
FIG. 5 depicts processing resources at a mobile computing implementing the method of FIG. 2, according to non-limiting embodiments.

Indeed, accessing a complex menu system can be resource intensive, (e.g. consuming significant amounts of processor and memory resources) and can lead to the device to freeze, or even crash, as accessing different menu screens is effected. The teachings herein can obviate or mitigate such intense resource use as the foregoing functional teachings are effected through either hardware or software configuration of the various components of mobile electronic device 110. FIG. 5 provides an exemplary illustration of how such processing resources are used in a less intensive manner.

FIG. 5 shows non-volatile memory device 114 and volatile memory device 115, processing unit 122 and display device 128 from FIG. 1 in isolation. Non-volatile memory device 114 in FIG. 5 maintains notification settings 123*a* which is a variation on notification settings 123 discussed above. Notification settings 123*a* comprises sixteen exemplary entries, denoted as 123*a*-1, 123*a*-2, 123*a*-3 . . . 123*a*-16, each of which comprises a notification setting for the same or different profiles. In particular, entries 123*a*-1, . . . 123*a*-4 comprise notification settings for a given application in a given profile (e.g. notification settings for a phone application in a "Normal" profile, as in FIG. 2). Notification setting 123*a* as shown within non-volatile memory device 114 represents that memory structures within non-volatile memory device 114 are configured so as to maintain a representation of notification setting 123*a*.

In FIG. 5, processing unit 122 is shown performing a first processing operation P-1 whereby entries 123*a*-1, 123*a*-2, . . . 123*a*-4 are loaded into volatile memory device 115, for example when key 127 is activated and the "Change Last Notification Setting" is chosen from UPDATED SYSTEM MENU. FIG. 5 also shows processing unit 122 performing a second processing operation P-2 whereby list items 123*a*-1, . . . 123*a*-4 are loaded from volatile memory device 115 into processing unit 122, and whereby processing unit 122 controls display device 128 so as to generate a representation of entries 123*a*-1, 123*a*-2 . . . 123*a*-4 on display device 128. Hence, by providing the "Change Last Notification Setting" in system menu list 129', such that it can be accessed via key 127 to change notification settings 123, data representative of the complex menu system is not loaded in to volatile memory device 115, neither is it processed by processing unit 122 and neither is display device 128 controlled to provide representations thereof (as in FIG. 2).

Those skilled in the art will appreciate that in some embodiments, the functionality of mobile electronic device 110 can be implemented using pre-programmed hardware or firmware elements (e.g., application specific integrated circuits (ASICs), electrically erasable programmable read-only memories (EEPROMs), etc.), or other related components. In other embodiments, the functionality of mobile electronic device 110 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for modifying notification settings on a mobile electronic device comprising a processing unit, a display, a memory, an input device, and at least one notification device, said method comprising,
   determining that said at least one notification device has been activated using a given notification setting when at least one associated notification triggering event occurs; and, in response to activation of said at least one notification device when said at least one associated notification triggering event occurs,
   changing a menu list to include a notification setting change option comprising a shortcut to a submenu of a menu system for controlling device notifications, said submenu for controlling said given notification setting, said menu list associated with said input device and stored in said memory, such that when said input device is activated, said display is controlled by said processing unit to provide a representation of said menu list such that said notification setting option can be selected and said given notification setting changed.

2. The method of claim 1, further comprising:
   determining that said input device has been activated;
   controlling said display device to display a representation of said menu list;
   determining that said notification setting change option has been selected; and
   changing said given notification setting.

3. The method of claim 1, wherein said notification setting change option is removed from said menu list in said memory after a given time period.

4. The method of claim 1, wherein said at least one associated notification triggering event comprises at least one of an alarm, a reminder, a calendar notification event, and receipt of data from a communication network.

5. The method of claim 4, wherein said data from said communication network includes at least one of an e-mail, a text message, a short message service (SMS) message, and a voice call.

6. The method of claim 1, wherein said at least one notification device includes at least one of a speaker enabled to play audio when said at least one associated notification triggering event occurs and a vibration motor enabled to cause said mobile electronic device to vibrate when said at least one associated notification triggering event occurs.

7. The method of claim 1, wherein said given notification setting includes at least one of a volume setting, an association between said at least one associated notification triggering event and an audio file, and a vibration setting.

8. The method of claim 7, wherein said audio file includes a ringtone.

9. A mobile electronic device for modifying notification settings, comprising:
a processing unit, a display, a memory, an input device, and at least one notification device, in communication via a computer bus, and enabled to:
determine that said at least one notification device has been activated using a given notification setting when at least one associated notification triggering event occurs; and, in response to activation of said at least one notification device when said at least one associated notification triggering event occurs,
change a menu list to include a notification setting change option comprising a shortcut to a submenu of a menu system for controlling device notifications, said submenu for controlling said given notification setting, said menu list associated with said input device and stored in said memory, such that when said input device is activated, said display is controlled by said processing unit to provide a representation of said menu list such that said notification setting option can be selected and said given notification setting changed.

10. The mobile electronic device of claim 9, further enabled to:
determine that said input device has been activated;
control said display device to display a representation of said menu list;
determine that said notification setting change option has been selected; and
change said given notification setting.

11. The mobile electronic device of claim 9, wherein said notification setting change option is removed from said menu list in said memory after a given time period.

12. The mobile electronic device of claim 9, wherein said at least one associated notification triggering event comprises at least one of an alarm, a reminder, a calendar notification event, and receipt of data from a communication network.

13. The mobile electronic device of claim 12, wherein said data from said communication network includes at least one of an e-mail, a text message, a short message service (SMS) message, and a voice call.

14. The mobile electronic device of claim 9, wherein said at least one notification device includes at least one of a speaker enabled to play audio when said at least one associated notification triggering event occurs and a vibration motor enabled to cause said mobile electronic device to vibrate when said at least one associated notification triggering event occurs.

15. The mobile electronic device of claim 9, wherein said given notification setting includes at least one of a volume setting, an association between said at least one associated notification event and an audio file, and a vibration setting.

16. The mobile electronic device of claim 15, wherein said audio file includes a ringtone.

* * * * *